United States Patent [19]

Bankeström

[11] Patent Number: 5,503,030
[45] Date of Patent: Apr. 2, 1996

[54] LOAD SENSING BEARING

[75] Inventor: Jan-Olof Bankeström, Va. Frölunda, Sweden

[73] Assignee: Aktiebolaget SKF, Goteborg, Sweden

[21] Appl. No.: 287,301

[22] Filed: Aug. 8, 1994

[30] Foreign Application Priority Data

Aug. 6, 1993 [SE] Sweden ................................ 9302576-5

[51] Int. Cl.$^6$ ................................................. G01N 13/00
[52] U.S. Cl. ................................ 73/862.627; 73/862.49; 73/862.54
[58] Field of Search ........................ 73/862.541, 862.55, 73/862.49, 862.628, 862.635, 862.627; 340/870.31

[56] References Cited

U.S. PATENT DOCUMENTS

| | | | |
|---|---|---|---|
| 4,175,430 | 11/1979 | Morrison et al. | 73/862.55 |
| 4,203,319 | 5/1980 | Lechler | 73/141 A |
| 5,140,849 | 8/1992 | Fujita et al. | 73/862.541 |
| 5,142,280 | 8/1992 | Lehle | 340/870.31 |
| 5,181,423 | 1/1993 | Philipps et al. | 340/870.31 |

*Primary Examiner*—Richard Chilcot
*Assistant Examiner*—R. Biegel
*Attorney, Agent, or Firm*—Burns, Doane, Swecker & Mathis

[57] ABSTRACT

Device for load measurement in roller bearings whereby the measurement is carried out by sensors arranged to measure forces applied on a bearing, and which communicates with circuitry for recording, processing and evaluation of signals emitted from the sensors, which are representative of the bearing load. At least one roller body (4a, 4b) per roller body row is provided with at least one bore (7) in which is provided at least one sensor (8), as well as circuitry (9, 10) for amplification and transmission of signals emitted from said sensor to a receiver (11) provided at the non-rotating bearing ring of the bearing. From the receiver, these signals are conducted further to external circuitry for signal processing, and so on.

10 Claims, 3 Drawing Sheets

LOAD SENSING BEARING

BACKGROUND OF THE INVENTION

The present invention refers to roller bearings with the ability to sense and determine a bearing load in magnitude as well as in direction.

In many applications where primarily large roller bearings are used, it is, from an aspect of process control, of great interest to be able to determine the momentary load of the bearing. Thus, one can, for example, with knowledge about the bearing load in an ore mill, control the degree of filling of the mill to be at an optimal level from a mining operation perspective. Further, it is possible to continuously monitor the condition of the bearing by means of the bearing load, since deviations from normal values may indicate different error functions or damage in the bearing.

For such purposes there have previously been suggested different types of force measurement bearings where the forces and loads are measured with strain gauge transducers located at the inner and/or the outer ring of the bearing. By influence of changing loads, which occur during operation, these strain gauge transducers obtain a measurable change of electric resistance of the transducer whereby load variations, according to the principle of an amplitude modulated carrier frequency system, generate a carrier frequency the amplitude of which represents the measurement value. This means that the rings have to be provided with a great number of strain gauge transducers, and at the same time a relatively complicated and thereby costly calibration of the bearing is required. Also, there are certain imperfections in these prior systems, which are known for example through U.S. Pat. No. 4,203,319.

SUMMARY OF THE INVENTION

An object of the present invention is to offer a load sensing roller bearing, in particular large dimension bearing, which is not afflicted with drawbacks of previous solutions.

Through the solution according to the present invention, which allows measurement of the actual roller load directly in the roller, calibration (which is necessary by previous solutions in order to eliminate influence caused by the casing and the like) has been eliminated. This means that the load sensing bearing according to the invention constitutes a practically finished end product, in contrast to classic force measuring bearings, which are only ready after first mounting and subsequent calibration.

BRIEF DESCRIPTION OF THE DRAWINGS

In the following, the invention will be described in greater detail with reference to the embodiment shown in the enclosed drawings wherein.

DETAILED DESCRIPTION OF PREFERRED EMBODIMENTS OF THE INVENTION

Figure 1:
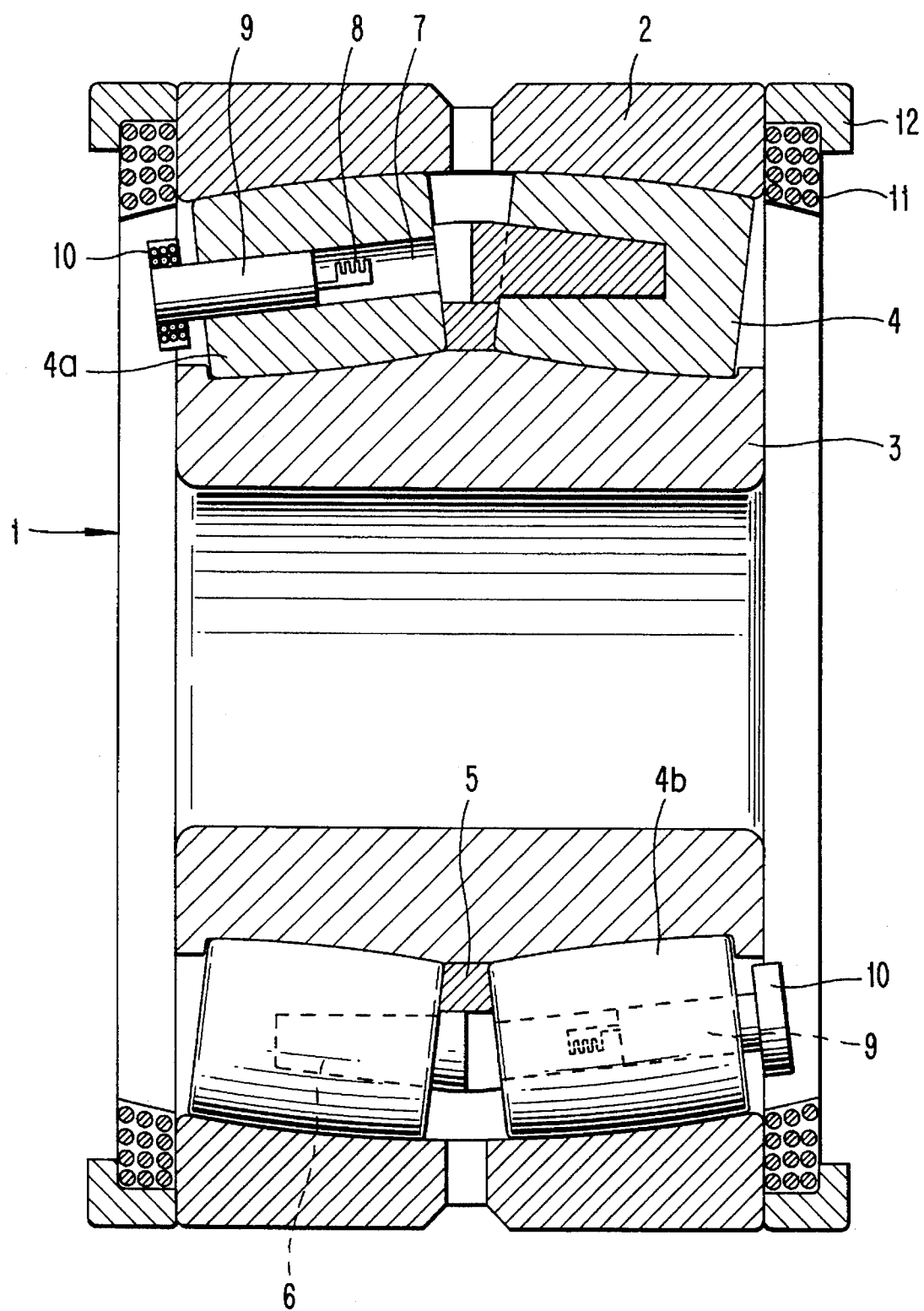
FIG. 1 shows in cross section a double row spherical roller bearing designed in accordance with the present invention.

In FIG. 1 a double row spherical radial roller bearing 1 is shown in cross section including an outer ring 2, an inner ring 3 provided therein, and a number of rollers 4 arranged in an annular space formed between the radially spaced bearing rings. The rollers 4 are guided and kept separated by means of a spacer ring 5 and a holder 6. According to this example of the invention, in each roller row, the rollers 4a and 4b respectively have been provided with a coaxial central bore 7.

In at least one central bore 7 is provided at least one sensor 8, for example, a strain gauge transducer, which is oriented preferably in the circumferential direction of the respective roller 7 and connected to a miniaturized amplifier/transmitter 9, which is mounted in the bore 7 as well.

A small coil 10 is connected to the amplifier/transmitter 9 and the end thereof protrudes outside the end of the rollers 4a and 4b respectively. This coil 10 arranged in the measuring roller communicates with a large, stationary coil 11 provided at the stationary bearing ring, that is, by the outer ring 2 in the example shown.

In the example this stationary, external coil 11 is fixed to the outer ring 2 by means of, e.g., a retainer ring 12 attached to the ring end face by means of screws, but of course the stationary coil 11 may also be bonded to the end face of the stationary ring, or attached by any other method to a housing, not shown, which encases the bearing.

The stationary coil 11 provides the coils 10 arranged in the rollers 4a and 4b respectively with energy. Each coil 10 arranged in one of the bores 7 sends continuous load data, in the form of strain values from the sensors 8, to measurement and evaluation equipment, e.g. , computer 13. The strain values are representative of the force or load to which the rollers 4a and 4b respectively are continuously exposed. In such a way, one obtains continuous measurement values of the bearing load.

By means of a separate coil provided in the bearing housing or the like (not shown), one may let the measuring device (8, 9) of the roller give an impulse when a given position at the bearing is passed, whereby one also may obtain an orientation of the bearing and thereby possibility to make an absolute direction determination for the load.

In this way, the coil system is used for energy supply to the amplifier/transmitter 9 as well as for signal transmission.

Figure 2:
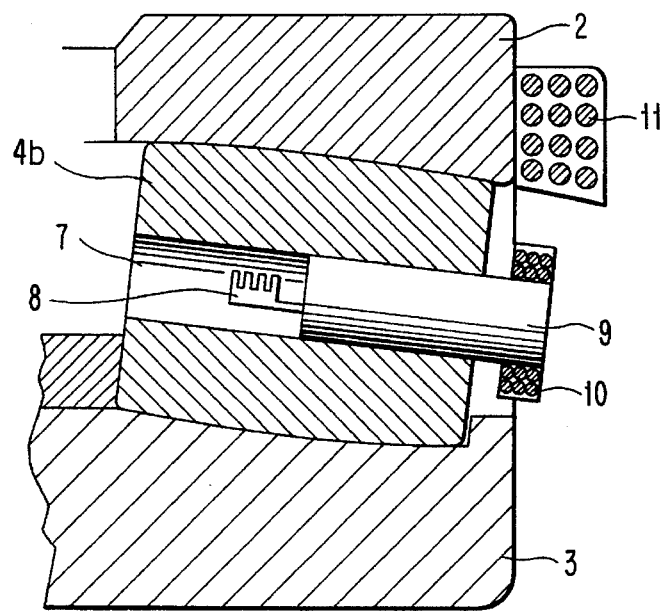
FIG. 2 shows schematically a portion of the bearing according to FIG. 1 with a roller contained therein depicted in cross section.

FIG. 2 shows in larger scale a section of the bearing according to the present invention, and, with a roller 4b provided with a measuring device (8, 9) in cross section, FIG. 2 shows how sensors 8 in the form of strain gauge transducers can be mounted on the wall of the bore 7.

Figure 3:
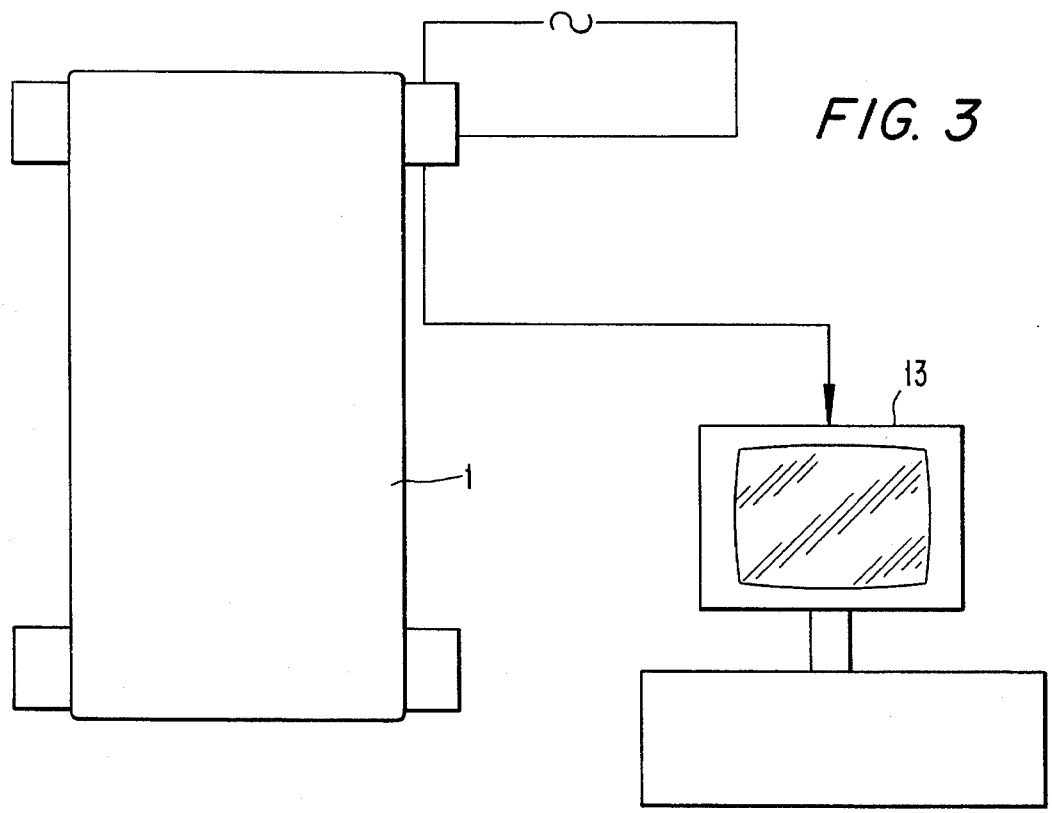
FIG. 3 is a schematic illustration of the bearing according to the present invention connected to a computerized measurement system.

FIG. 3 schematically illustrates how the signals emitted from the sensors in a roller in each roller row in the bearing according to the present invention via the coil system are transmitted to a computer 13, in which the signals are processed and evaluated by a method which does not constitute any real part of the present invention.

With a bearing of this type, it is possible by a simple and reliable method to measure the total magnitude of the bearing load and direction in the plane of the bearing as well as axially. These measurements may be important to optimize certain processes where bearings are exposed to process conditioned forces and loads, which may affect the process result.

Further, by this method one may acquire knowledge about an error function of a bearing. For example, if a bearing that should be axially free of load suddenly carries an axial load, then an error may be detected.

In addition, with the measuring results obtained it is possible to determine the internal load distribution of a bearing, which is of importance when calculating the bearing life time at the design stage. Also, when mounting the bearing, the measuring results make it possible to take actions to control the load distribution.

Direct damage on the race tracks of bearing and the roller bodies may also be detected through measurement of the roller load.

The measurement may be carried out either continuously in real time or by random sampling and, while the example shown refers to a double row spherical roller bearing, the present invention is naturally also applicable to cylindric or conical roller bearings, for example spherical axial roller bearings, and so on.

The sensors 8 illustrated as strain gauge transducers have been shown to be arranged in middle of the hole 7 but they may also be provided at both ends of the hole 7 or axially separated and it is also possible to connect several strain gauge transducers in a bridge form.

Figure 4:
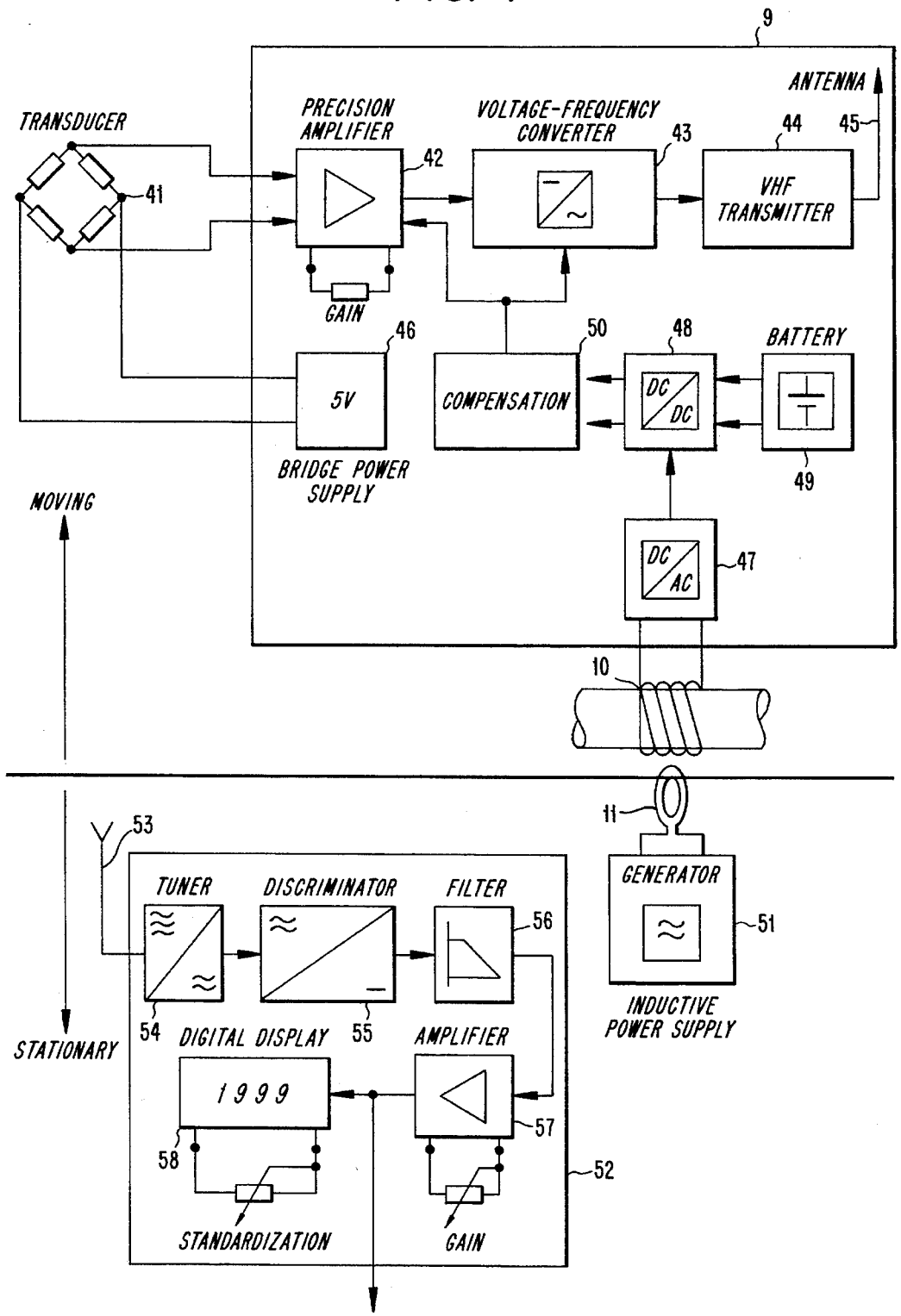
FIG. 4 is a schematic illustration of specific embodiment of a the bearing according to the present invention.

An example of such an embodiment is shown in FIG. 4. In FIG. 4, the strain gauge transducer is in the form of a Wheatstone bridge 41. The outputs of the Wheatstone bridge 41 are input to a precision amplifier 42 which may include a variable or fixed gain. To the precision amplifier 42 is connected a voltage-to-frequency converter 43, which in turn is connected to a VHF transmitter 44 for transmission over an antenna 45.

The transducer 41 may be powered by a bridge power supply 46 such as a battery, or, alternatively, through an inductive power supply 51 (mounted on the stationary side of the ring 2) through the stationary coil 11, the moving coil 10 and a AC-to-DC converter 47. Similarly, a compensation circuit 50, for compensating the precision amplifier 42 and the voltage-to-frequency converter 43, may be supplied with power from a DC-to-DC converter 48. The DC-to-DC converter 48 is alternatively supplied by power from a battery 49 or from the inductively coupled AC-to-DC converter 47.

By this circuitry, the strain measured by the transducer 41 is transmitted via a very high frequency to a receiver 52. The receiver 52 is connected to an antenna 53. The receiver includes a tuner 54, which is serially connected to a discriminator 55 and a filter 56 for separating the transmitted signal from the carrier frequency. The resulting signal is then amplified by an amplifier 57, which may include a variable gain. The amplifier output is connected to the computer 13 and, optionally, to a digital display 58, which also includes a variable gain for standardization.

As mentioned above, more than one roller 4a and 4b can be equipped with a moving coil 10, within the stationary coil 11. By the embodiment of FIG. 4, this poses no problem in that the signal transmitted between the moving coil 10 and the stationary coil 11 is used for energizing the strain gauge 41 and the transmitter circuitry 9 and therefore is the same each moving coil 10. The transmitter 9 can be FM transmitters adapted to transmit on different frequencies or other channel diversity mechanism. Therefore, the computer 13 would be able to distinguish between the output signals received from the different transmitter in the same row of rollers.

In the drawing and the specification has been shown and indicated that one roller in each row of roller bodies is provided with a measurement device, but it is naturally implicit that more than one roller in each roller body row may be provided with such a device, even if the complexity in the measurements hereby increases, as well as the cost of the equipment.

The roll provided with the device has been shown with a centrally located through bore, but it is also possible to arrange several eccentrically located bores, for example four bores arranged symmetrically about the roller center, and it is not necessary that the bore passes through the bearing.

In the figures the distance between the stationary coil and the movable coil arranged in the rollers 4a, 4b is exaggerated. This distance in the reality is only a few millimeters.

As has been indicated, the sensors actually used may be of other types than strain gauge transducers.

Signal transmission from, as well as energy input supply to the roll/the rolls may be achieved by another method than has been illustrated and described, such as for example by radio transmission or by pulsed microwave technique or the like.

The invention is neither limited nor restricted to the embodiments shown in enclosed drawings and the embodiments described in connection thereto, but modifications are possible within the scope of the subsequent claims.

What is claimed:

1. Apparatus comprising:
   a roller bearing, including:
      a support structure including a non-rotatable bearing ring having a longitudinal axis,
      a rotatable bearing ring spaced radially from said non-rotatable bearing ring to form an annular space therebetween, said rotatable bearing ring being rotatable relative to said non-rotatable bearing ring about said longitudinal axis, and
      a plurality of roller bodies disposed in said annular space and being movable within said annular space during operation of said roller bearing; and
   a load measuring system for measuring loads imposed on said roller bearing, including:
      a sensor mounted on at least one of said roller bodies for measuring forces applied to the roller bearing and emitting signals representative of bearing load, said sensor being displaceable along a circular path during movement of the at least one roller body,
      a signal transmitter operatively connected to said sensor for transmitting said signals emitted therefrom, said signal transmitter including a first coil electrically and physically connected to said sensor to be displaced therewith along a circular path when said sensor is displaced, and
      a signal receiver for receiving said transferred signals, said signal receiver including a second coil mounted non-rotatably to said support structure at a location such that the circular path in which said first coil is displaced is located closely adjacent said second coil.

2. The apparatus according to claim 1, wherein said rotatable bearing ring is situated radially inside of said non-rotatable ring, said first coil being situated radially inside of said second coil.

3. The apparatus according to claim 1, wherein said second coil is mounted on a side of said non-rotatable bearing ring.

4. The apparatus according to claim 1, wherein there is a plurality of said sensors mounted to respective roller bodies, said signal transmitter comprising a plurality of said first coils electrically connected to respective sensors and mounted on respective roller bodies.

5. The apparatus according to claim 1, wherein said sensor is mounted in a bore formed in said at least one roller body.

6. The apparatus according to claim 1, wherein said sensor comprises a strain gauge.

7. The apparatus according to claim 5, wherein said transmitter comprises a transmitter/amplifier mounted in said bore and electrically connected to said sensor, said first coil electrically connected to said transmitter/amplifier.

8. The apparatus according to claim 1, wherein said transmitter comprises a transmitter/amplifier mounted to said one roller and electrically connected to said sensor, said first coil electrically connected to said transmitter/amplifier.

9. The apparatus according to claim 1 further comprising an analyzer which records, processes and evaluates signals emitted from the sensor.

10. The apparatus according to claim 9, wherein the analyzer comprises a computer.

* * * * *